US009711187B1

(12) United States Patent
Okamoto et al.

(10) Patent No.: US 9,711,187 B1
(45) Date of Patent: Jul. 18, 2017

(54) DISK DEVICE AND METHOD OF MANUFACTURING DISK DEVICE ENCLOSURE INCLUDING LASER WELDING A PERIPHERAL EDGE PORTION OF A COVER TO A BASE OF THE ENCLOSURE

(71) Applicant: Kabushiki Kaisha Toshiba, Minato-ku, Tokyo (JP)

(72) Inventors: Makoto Okamoto, Kodaira Tokyo (JP); Yasutaka Sasaki, Yokohama Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 15/067,584

(22) Filed: Mar. 11, 2016

Related U.S. Application Data

(60) Provisional application No. 62/278,719, filed on Jan. 14, 2016.

(51) Int. Cl.
| | | |
|---|---|---|
| *G11B 33/12* | (2006.01) | |
| *G11B 33/14* | (2006.01) | |
| *B23K 26/22* | (2006.01) | |
| *B23K 26/14* | (2014.01) | |
| *G11B 33/02* | (2006.01) | |
| *B23K 101/36* | (2006.01) | |
| *G11B 25/04* | (2006.01) | |

(52) U.S. Cl.
CPC .......... *G11B 33/1446* (2013.01); *B23K 26/14* (2013.01); *B23K 26/22* (2013.01); *G11B 33/027* (2013.01); *G11B 33/121* (2013.01); *B23K 2201/36* (2013.01); *G11B 25/043* (2013.01)

(58) Field of Classification Search
CPC .. G11B 25/043; G11B 33/121; G11B 33/1446
USPC .............................................. 360/99.2, 99.21
See application file for complete search history.

(56) References Cited

U.S. PATENT DOCUMENTS

| | | | | |
|---|---|---|---|---|
| 4,521,668 A * | 6/1985 | Osial | .................... | B23K 26/206 |
| | | | | 219/121.64 |
| 5,451,742 A * | 9/1995 | Nishio | ................... | B23K 26/22 |
| | | | | 219/121.64 |
| 6,290,085 B1 * | 9/2001 | Tochigi | ................ | B23K 20/122 |
| | | | | 219/121.63 |
| 7,119,984 B2 * | 10/2006 | Macleod | ................ | B23K 26/12 |
| | | | | 360/99.18 |
| 2003/0223148 A1 * | 12/2003 | Macleod | ................ | B23K 26/12 |
| | | | | 360/99.18 |

(Continued)

FOREIGN PATENT DOCUMENTS

| | | |
|---|---|---|
| JP | 2008-161911 A | 7/2008 |
| JP | 2009-195948 A | 9/2009 |

*Primary Examiner* — Jefferson Evans
(74) *Attorney, Agent, or Firm* — White & Case LLP

(57) ABSTRACT

According to one embodiment, a disk device includes a rotatable disk-shaped recording medium, an actuator supporting a head to be movable with respect to the recording medium, and an enclosure includes a base accommodating the recording medium and the actuator, and a cover fixed to the base and includes a peripheral edge portion including a welded portion laser-welded to the base. The welded portion includes weld beads arranged along the entire peripheral edge portion of the cover, and the weld beads include at least two circular weld beads in the peripheral edge portion of the cover.

12 Claims, 7 Drawing Sheets

(56) References Cited

U.S. PATENT DOCUMENTS

| | | | |
|---|---|---|---|
| 2004/0021980 A1* | 2/2004 | Albrecht | G11B 5/6005 360/99.21 |
| 2006/0191881 A1* | 8/2006 | Yamauchi | G11B 19/2009 219/121.64 |
| 2008/0068745 A1* | 3/2008 | Uefune | G11B 25/043 360/99.21 |
| 2008/0165448 A1 | 7/2008 | Ichikawa et al. | |
| 2011/0310509 A1* | 12/2011 | Stipe | G11B 25/043 360/97.22 |
| 2013/0222947 A1* | 8/2013 | Sugii | G11B 23/505 360/99.08 |
| 2014/0254983 A1* | 9/2014 | Moriya | G02B 6/4251 385/18 |
| 2014/0377578 A1 | 12/2014 | Hisada et al. | |

* cited by examiner

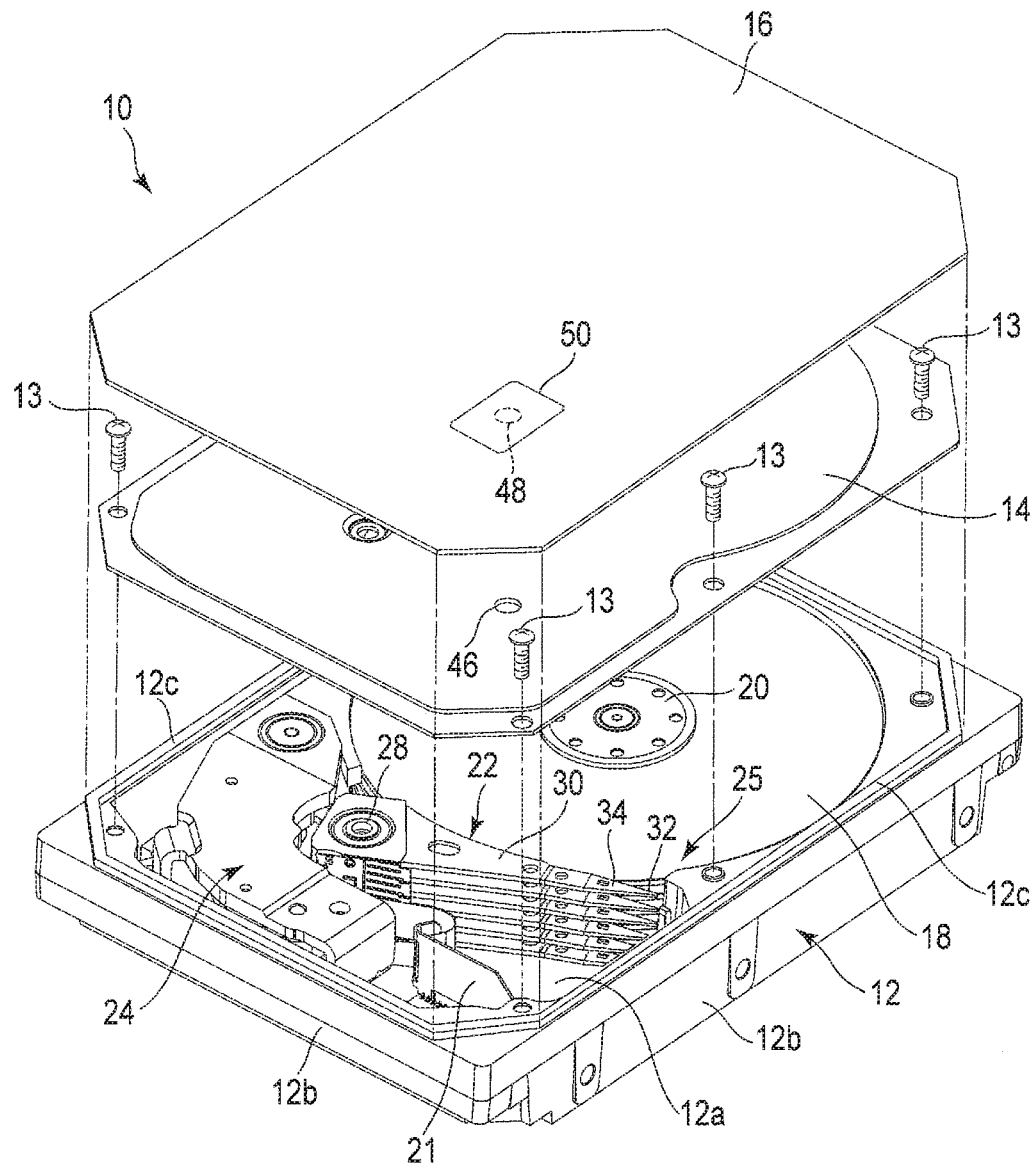
F I G. 2

DISK DEVICE AND METHOD OF MANUFACTURING DISK DEVICE ENCLOSURE INCLUDING LASER WELDING A PERIPHERAL EDGE PORTION OF A COVER TO A BASE OF THE ENCLOSURE

CROSS-REFERENCE TO RELATED APPLICATIONS

This application claims the benefit of U.S. Provisional Application No. 62/278,719, filed Jan. 14, 2016, the entire contents of which are incorporated herein by reference.

FIELD

Embodiments described herein relate generally to a disk device and a method of manufacturing the disk device.

BACKGROUND

Recently, a disk device such as a magnetic disk device and an optical disk device is widely used as an external recording device and an image recording device of a computer. In the magnetic disk device, a rotatable magnetic disk and an actuator supporting a magnetic head are generally provided in an enclosure. In order to improve performance of the magnetic disk device, a method of filling the enclosure with low-density gas such as helium and reducing rotational resistance of the magnetic disk and the magnetic head is suggested.

In such a magnetic disk device, airtightness of an enclosure is improved by using an airtight enclosure formed by laser-welding a top cover to an enclosure base. For example, pulse irradiation is used as a laser irradiation method and the top cover is irradiated with a laser beam while laser output is repeatedly turned on and off. In such a magnetic disk device, it is required that time for laser welding is reduced and seal performance is further improved.

BRIEF DESCRIPTION OF THE DRAWINGS

FIG. 2 is an exploded perspective view of the HDD of the first embodiment.

DETAILED DESCRIPTION

Various embodiments will be described hereinafter with reference to the accompanying drawings. In general, according to one embodiment, a disk device comprises: a rotatable disk-shaped recording medium; an actuator supporting a head to be movable with respect to the recording medium; and an enclosure comprising a base accommodating the recording medium and the actuator, and a cover fixed to the base and comprising a peripheral edge portion including a welded portion laser-welded to the base. The welded portion comprises weld beads arranged along the entire peripheral edge portion of the cover, and the weld beads include at least two circular weld beads in the peripheral edge portion of the cover.

As a magnetic disk device, a hard disk drive (HDD) of an embodiment is hereinafter described in detail.

First Embodiment

Figure 1:
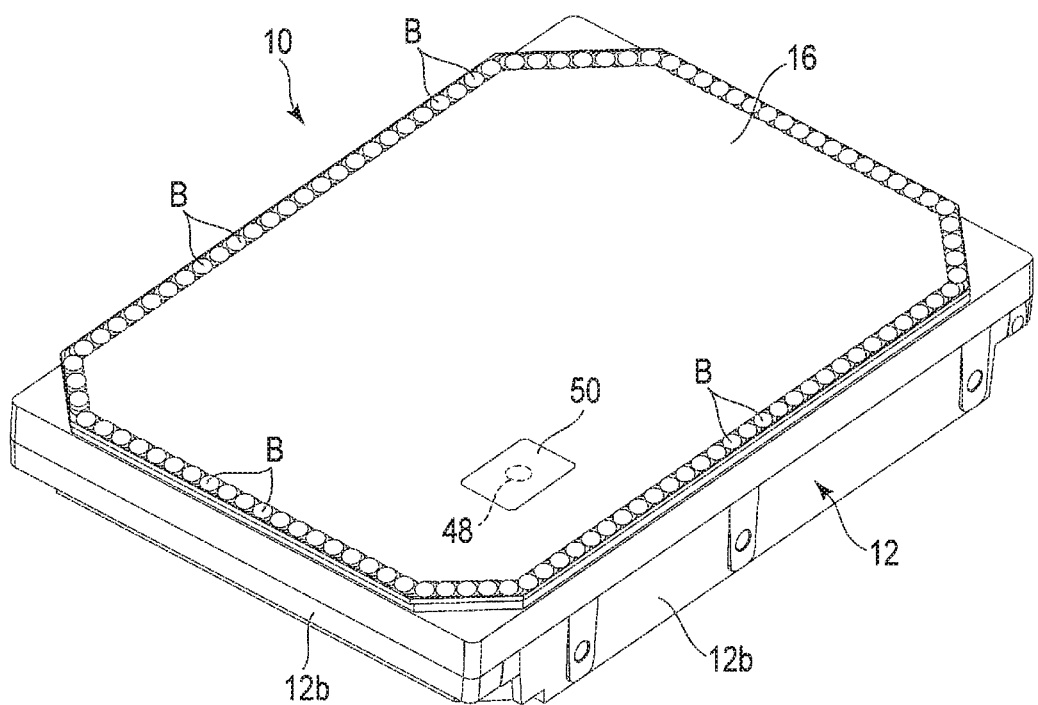
FIG. 1 is a perspective view showing an appearance of a hard disk drive (HDD) of a first embodiment.

FIG. 1 is a perspective view showing an appearance of an HDD of a first embodiment. FIG. 2 is an exploded perspective view showing an inner structure of the HDD.

As shown in FIG. 1 and FIG. 2, the HDD comprises a flat and substantially-rectangular enclosure 10. The enclosure 10 comprises a base 12 having the shape of an open-top rectangular box, an inner cover 14 secured to the base 12 by screws 13 to close the opening at the top of the base 12, and an outer cover (top cover) 16 overlapping the inner cover 14 and welded to the base 12 at the peripheral edge portion. The base 12 comprises a rectangular bottom wall 12a opposed to the inner cover 14 with space between and a side wall 12b provided along the peripheral edge of the bottom wall, which are integrally formed of, for example, aluminum. A substantially-rectangular fixation rib 12c is provided on the upper surface of the side wall 12b.

The inner cover 14 is formed by stainless steel, for example, into the shape of a rectangular plate. The outer peripheral edge portion of the inner cover 14 is secured to the upper surface of the side wall 12b by the screws 13 and fixed inside the fixation rib 12c. The outer cover 16 is formed of aluminum, for example, into the shape of a rectangular plate. The dimensions of the outer cover 16 are slightly greater than those of the inner cover 14. The entire outer peripheral edge portion of the outer cover 16 is welded to the fixation rib 12c of the base 12 and airtightly fixed. A welded construction will be described later in detail.

Air holes 46 and 48 through which the enclosure 10 communicates with the outside are formed in the inner cover 14 and the outer cover 16, respectively. The air in the enclosure 10 is exhausted from the air holes 46 and 48 and the enclosure 10 is filled with low-density gas (inert gas) lower than the air in density such as helium through the air holes 46 and 48. For example, a seal (sealant) 50 is attached to the outer surface of the outer cover 16 to close the air hole 48.

As shown in FIG. 2, in the enclosure 10 are provided magnetic disks 18 serving as a recording medium and a spindle motor 20 serving as a drive section supporting and rotating the magnetic disks 18. The spindle motor 20 is provided on the bottom wall 12a. Each magnetic disk 18 has a diameter of, for example, 88.9 mm (3.5 inches), and comprises a magnetic recording layer on the upper or lower surface. The magnetic disks 18 are engaged coaxially with a hub (not shown) of the spindle motor 20, clamped by a clamp spring and fixed to the hub. Each magnetic disk 18 is thereby supported parallel to the bottom wall 12a of the base 12. Each magnetic disk 18 is rotated by the spindle motor 20 for a predetermined number of rotations.

As shown in FIG. 2, for example, five magnetic disks 18 are accommodated in the enclosure 10 in the present embodiment, but the number of the magnetic disks 18 is not limited to this. A single magnetic disk 18 may be accommodated in the enclosure 10.

In the enclosure 10 are provide magnetic heads 32 configured to record and reproduce data in the magnetic disks 18 and a head stack assembly (actuator) 22 supporting the magnetic heads 32 to be movable with respect to the magnetic disks 18. In addition, in the enclosure 10 are provided a voice coil motor (hereinafter referred to as a VCM) 24 configured to rotate and position the head stack assembly 22, a ramp load mechanism 25 configured to hold the magnetic heads 32 in an unload position where the magnetic heads 32 are separated from the magnetic disks 18 when the magnetic heads 32 are moved to the outermost circumferential part of the magnetic disks 18, and a substrate unit 21 equipped with electronic components such as a conversion connector.

The head stack assembly 22 comprises a rotatable bearing unit 28, arms 30 extending from the bearing unit 28 and suspensions 34 extending from the respective arms 30. The magnetic heads 32 are supported on the distal ends of the respective suspensions 34.

A printed circuit board (not shown) is screwed to the outer surface of the bottom wall 12a of the base 12. The printed circuit board controls operation of the spindle motor 20 and also controls operation of the VCM 24 and the magnetic heads 32 through the substrate unit 21.

Figure 3:
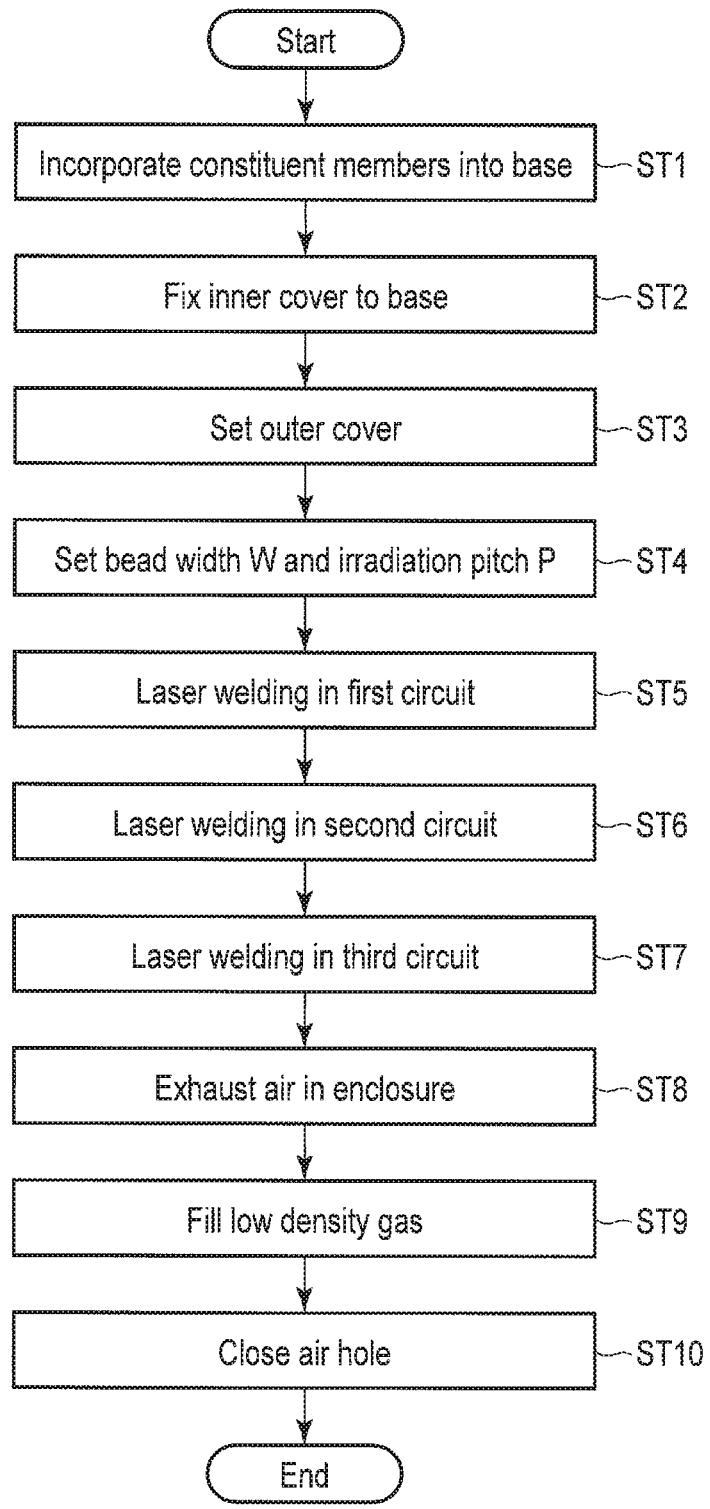
FIG. 3 is a flowchart schematically showing a manufacturing process of the HDD of the first embodiment.
Figure 4:
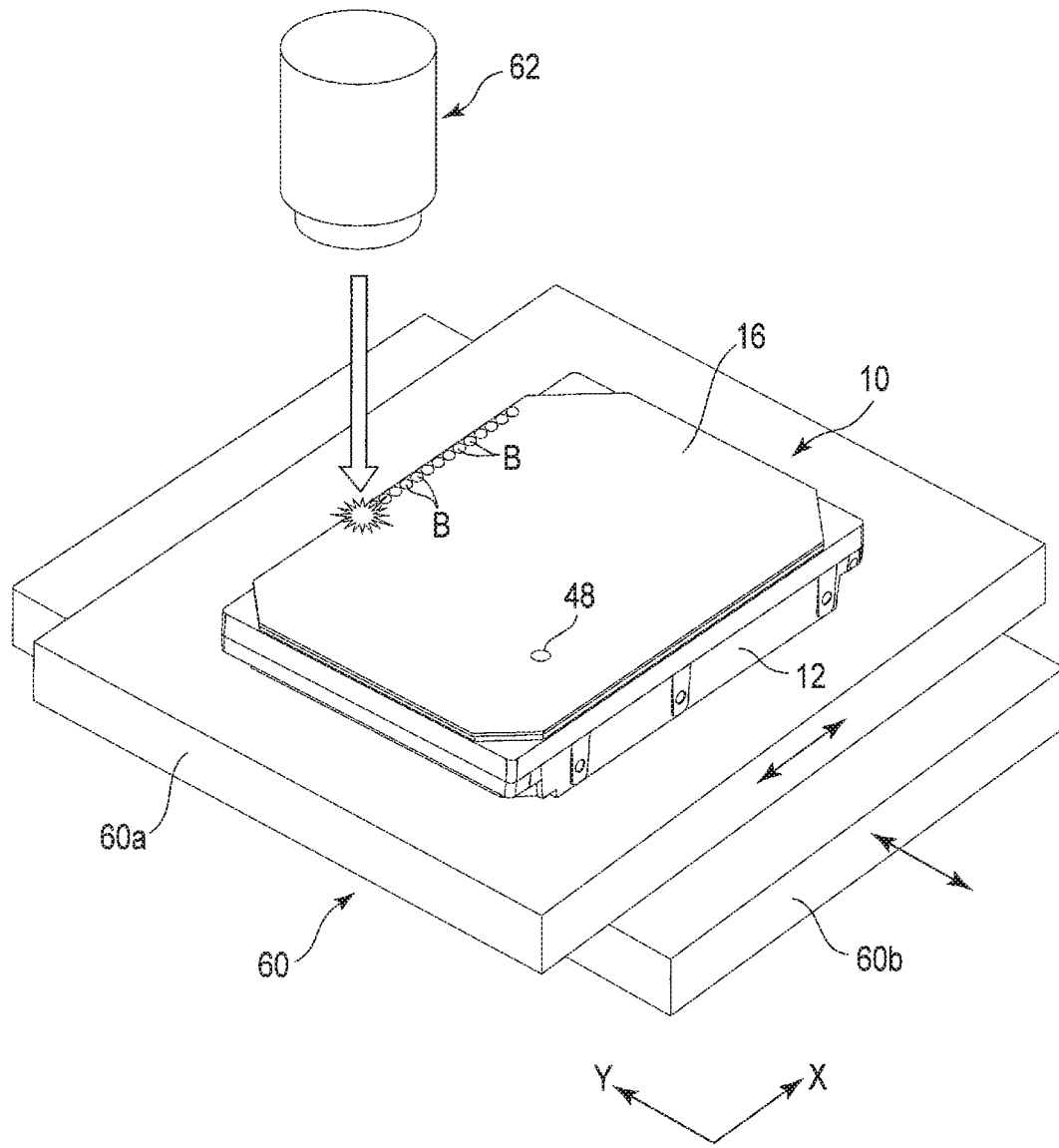
FIG. 4 is a perspective view schematically showing a welding process of the HDD of the first embodiment.

Next, a manufacturing method, a welding method and a welded construction of the HDD configured above are described. FIG. 3 is a flowchart schematically showing an example of a manufacturing process. FIG. 4 is a perspective view schematically showing an example of a welding process of the HDD.

As shown in FIG. 3, a spindle motor 20, magnetic disks 18, a head stack assembly 22 and other constituent members are first incorporated into a base 12 of an enclosure 10, for example, in a clean room (ST1). Next, an opening of the base 12 is closed by covering the base 12 with an inner cover 14 and fixing the inner cover 14 to the base 12 by screws 13 (ST2).

Then, the inner cover 14 is covered with an outer cover 16 (ST3), and the enclosure 10 is set on an XY table 60 as shown in FIG. 4. The XY table 60 comprises, for example, a Y-axis table 60b reciprocable in a Y-direction, an X-axis table 60a provided on the Y-axis table 60b and reciprocable in an X-direction perpendicular to the Y-direction, and a driving source (not shown) configured to drive each of the Y-axis table 60b and the X-axis table 60a. A laser beam irradiation device (irradiation optical head) 62 is provided above the XY table 60. The laser beam irradiation device 62 irradiates a predetermined position on the outer cover 16 of the HDD with a laser beam of a predetermined diameter, partially melts the outer cover 16 and the rib of the base 12 and thereby welds the outer cover 16 to the base 12. Since the outer cover 16 is partially molten and solidified by welding, beads (weld beads) B of a predetermined diameter are formed in the outer peripheral edge portion of the outer surface of the outer cover 16.

In the welding process, the outer peripheral edge portion of the outer cover 16 is sequentially pulse-irradiated with the laser beam by the laser beam irradiation device 62 while the enclosure 10 is arbitrarily moved in the X- and Y-directions by the XY table 60. In other words, the laser beam irradiation device 62 irradiates the outer peripheral edge portion of the outer cover 16 with the laser beam by going round the outer cover 16 several times while repeatedly turning on and off laser output. The outer peripheral edge portion of the outer cover 16 can be thereby welded to the base 12.

Figure 5:
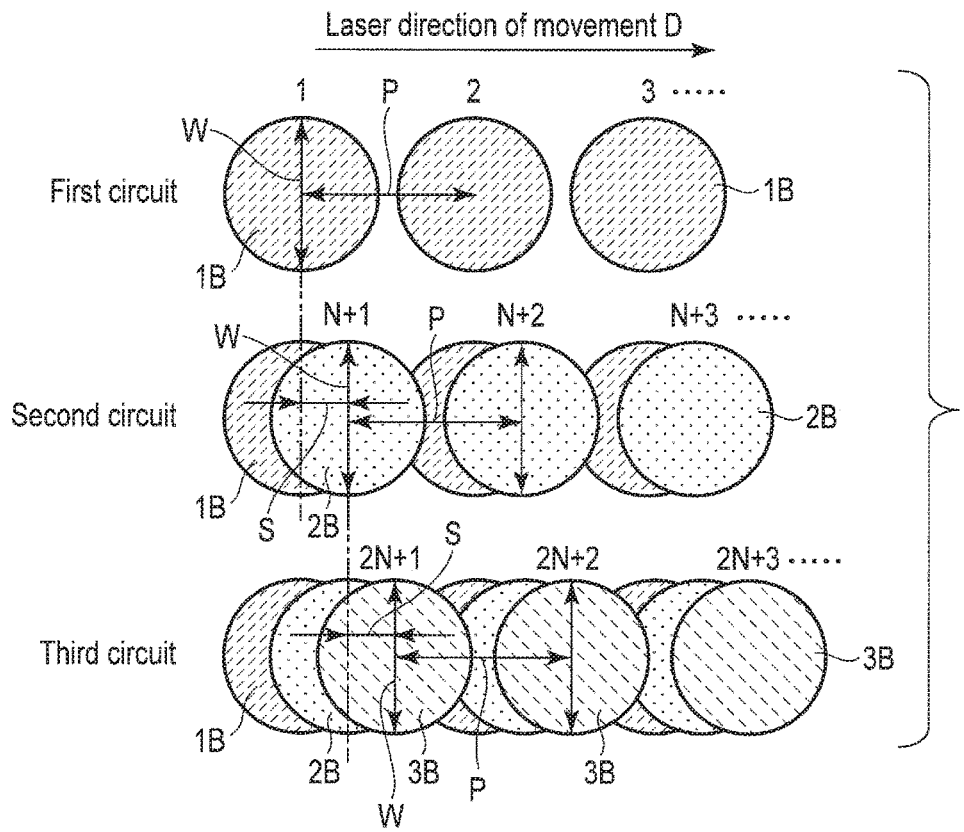
FIG. 5 is an illustration schematically showing formation states of weld beads in the first, second and third circuits of the welding process of the first embodiment.
Figure 6:
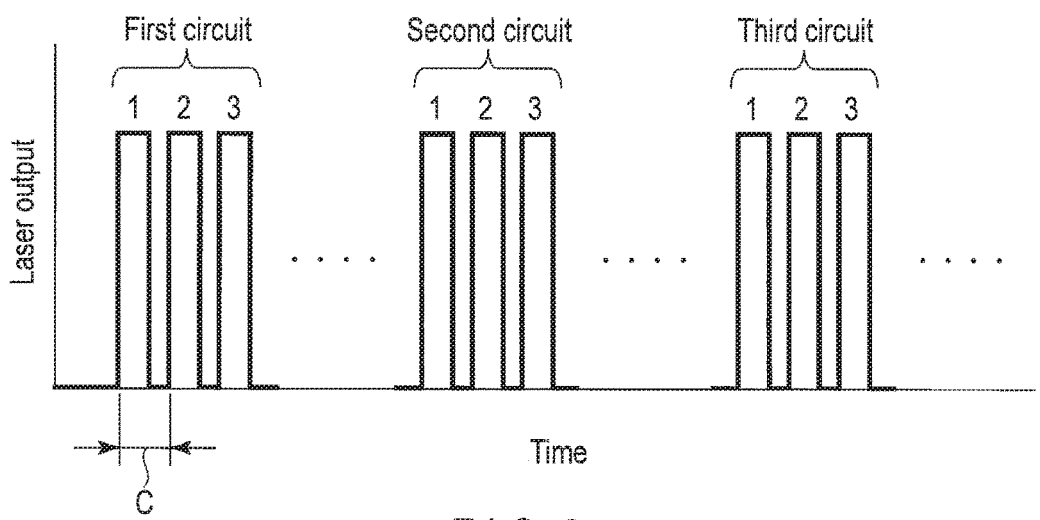
FIG. 6 is a graph showing a relationship between laser irradiation time and laser output in the welding process of the first embodiment.

FIG. 5 is an illustration schematically showing formation states of weld beads in the first, second and third circuits of the welding process. FIG. 6 is a graph showing a relationship between laser irradiation time and laser output in the welding process. As shown in FIG. 5 and FIG. 6, in the laser welding in the first circuit, first circular beads 1B (1, 2, 3, ..., N) (N is the total number of beads in the first circuit) are formed along the outer peripheral edge portion of the outer cover 16 by pulse irradiation of the laser beam. Each first bead 1B (1, 2, 3, ..., N) has a diameter (width) W. A pitch (pitch between first beads) of the laser beam irradiation is set to be greater than the bead diameter W (ST4). As a result, the first beads 1B are arranged with small spaces therebetween without overlapping each other (ST5). In the present embodiment, W<P<2W. In this manner of laser welding, laser irradiation can be performed without waiting for a molten part of the preceding first bead 1B to be solidified and a laser beam irradiation cycle C can be shortened as shown in FIG. 6.

Since an area between adjacent two first beads 1B is not molten in the laser welding in the first circuit, the laser beam irradiation device 62 continuously irradiates the outer peripheral edge portion of the outer cover 16 with the laser beam for more circuits. As shown in FIG. 5, in the laser irradiation in the second circuit, second circular beads 2B (N+1, N+2, N+3, ..., 2N) (N is the total number of beads in the first circuit) having the diameter W are arranged with the pitch P greater than the diameter W (ST6). At this time, each second bead 2B (N+1, N+2, N+3, ..., 2N) is slightly deviated from a first bead 1B (1, 2, 3, ..., N) in a relative direction of movement D of the laser beam by an amount of deviation S and partially overlaps the first bead 1B and the adjacent first bead 1B.

Next, as shown in FIG. 5, in the laser beam irradiation in the third circuit, third circular beads 3B (2N+1, 2N+2, 2N+3, ..., 3N−1) (N is the total number of beads in the first circuit) having the diameter W are arranged with the pitch P greater than the diameter W (ST7). At this time, each third bead 3B (2N+1, 2N+2, 2N+3, ..., 3N−1) is slightly deviated from a second bead 2B (N+1, N+2, N+3, ..., 2N) in the relative direction of movement D of the laser beam by the amount of deviation S and partially overlaps the second bead 2B and the adjacent first and second beads 1B and 2B.

In this manner, the entire outer peripheral edge portion of the outer cover 16 can be completely laser-welded. The second beads 2B (N+1, N+2, N+3, ...) overlap the large part of the first beads 1B (1, 2, 3, ...) and the third beads 3B (2N+1, 2N+2, 2N+3, ...) overlap the large part of the second beads 2B (N+1, N+2, N+3, ...) and are maintained as circular beads in the welded part.

In the present embodiment, the outer cover 16 is scanned by the laser beam while moving the enclosure 10 by the XY table 60. However, the scan may be carried out by fixing the enclosure 10 and moving the laser beam irradiation device 62. The irradiation pitch P and the amount of deviation S may be adjusted such that laser beam irradiation is performed for two circuits or four or more circuits.

In the manufacturing process of the HDD, after the above-described laser welding, the air in the enclosure 10 is evacuated from the air holes 46 and 48 (ST8), and then the enclosure 10 is filled with low-density gas (inert gas) lower than the air in density such as helium through the air holes 46 and 48 (ST9). After that, a seal 50 is adhered to the outer surface of the outer cover 16 and the air hole 48 is thereby closed (ST10). The airtight HDD filled with the low-density gas can be obtained in the above process.

According to the magnetic disk device configured above and the method of manufacturing the magnetic disk, a pitch of forming beads, i.e., a pitch of laser beam irradiation are greater than a diameter (maximum width) of the beads. Therefore, laser irradiation can be performed without waiting a molten part of the preceding bead B to be solidified.

If a pitch of laser beam irradiation is less than a diameter (maximum width) of beads as in a conventional welding method, laser beam irradiation should be performed after a molten part of the preceding bead B is solidified in order to prevent weld quality loss. As a result, it takes time for laser welding of the enclosure 10. Increasing the irradiation pitch is considered as a measure to reduce time for laser welding, but in this case seal performance is deteriorated since the minimum bead width is reduced.

Therefore, in the present embodiment, a pitch of laser beam irradiation is set to be greater than a diameter (maximum width) of beads and an outer peripheral edge portion of the outer cover 16 is welded by being irradiated with the laser beam for several circuits. As a result, the laser beam irradiation cycle can be shortened and the time for laser welding can be largely reduced. For example, in an HDD of 3.5 inches, it takes only about thirty seconds for welding operation in the manufacturing method of the present embodiment even if laser welding is performed for three circuits, in contrast to the conventional welding method which requires one to two minutes for welding operation.

In the conventional welding method, a welded construction in which a single circular bead exists in the outer peripheral edge portion of the outer cover 16 is basically achieved. In contrast, in the present embodiment, a welded construction in which the third circular beads 3B are arranged with the pitch P in each edge of the outer peripheral edge portion of the outer cover 16 is achieved.

Next, an HDD and a method of manufacturing the HDD of another embodiment are described. In the embodiment described below, the same elements as those of the first embodiment are represented by the same reference numbers and their detailed description is omitted. Differences from the first embodiment are mainly described in detail.

Second Embodiment

Figure 7:
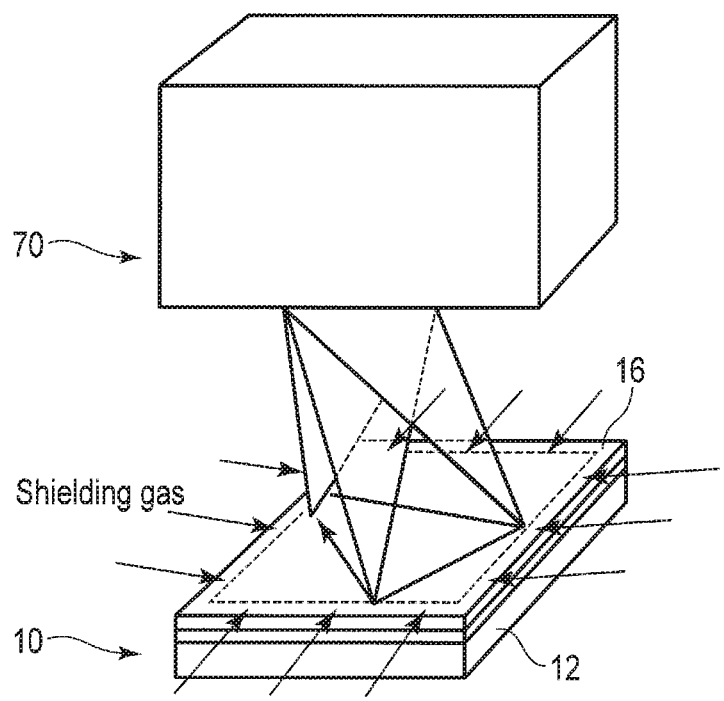
FIG. 7 is a perspective view schematically showing a welding process of a manufacturing method of a second embodiment.
Figure 8:
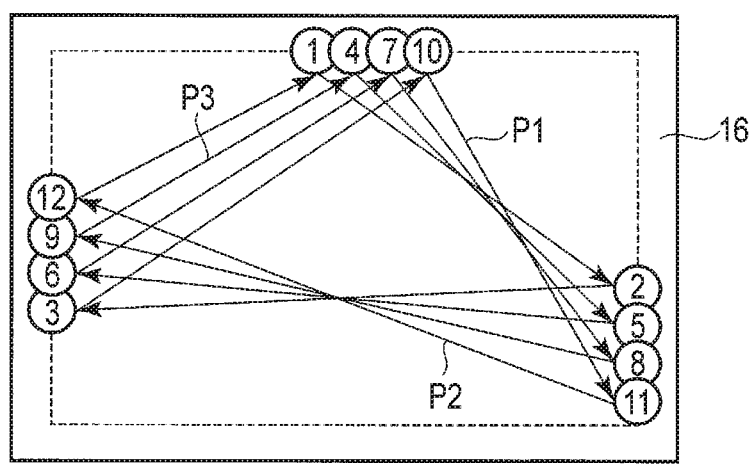
FIG. 8 is a plan view of an enclosure showing positions and the order of laser irradiation in the welding process of the second embodiment.
Figure 9:
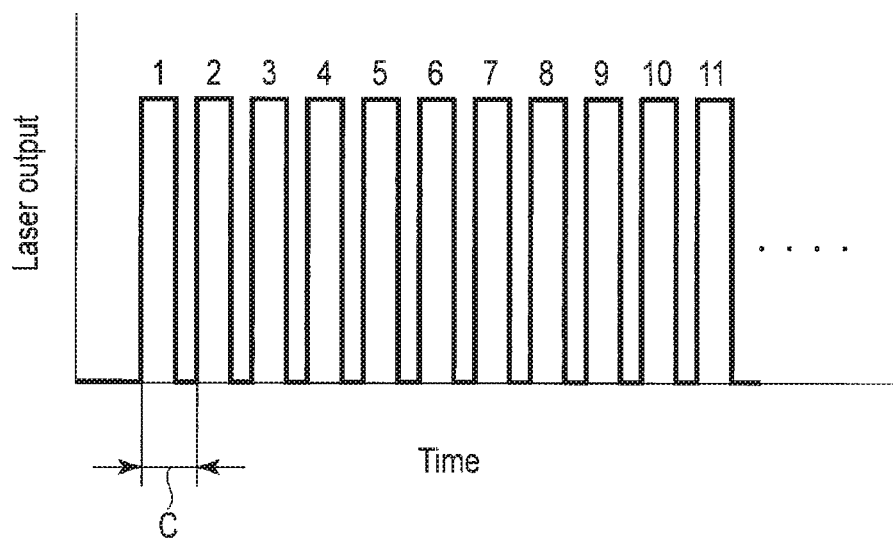
FIG. 9 is a graph showing a relationship between laser irradiation time and laser output in the welding process of the second embodiment.

FIG. 7 is a perspective view schematically showing a welding process of a manufacturing method of a second embodiment. FIG. 8 is a plan view of an enclosure showing positions and the order of laser irradiation in the welding process of the second embodiment. FIG. 9 is a graph showing a relationship between laser irradiation time and laser output in the welding process of the second embodiment.

In the second embodiment, the outer cover 16 is laser-welded by using a galvano scanner 70 as a laser irradiation device. The galvano scanner 70 is a device for two- or three-dimensional laser beam scanning using one or more mirrors.

As shown in FIG. 7 to FIG. 9, in the welding process of the manufacturing method, laser welding is performed by pulse irradiation of a laser beam with irradiation pitches P1, P2 and P3 largely greater than a diameter W of beads, for example, double the diameter W or more. For example, weld beads are formed by irradiating one of the long side edges of the outer cover 16, one of the short side edges, and the other of the short side edges with a laser beam in the order of beads 1, 2, 3, . . . shown in FIG. 8. The distances between beads 1 and 2, between beads 2 and 3 and between beads 3 and 1 along the outer peripheral edge portion of the outer cover 16 are preferably equal to each other. The following beads are sequentially formed to partially overlap the preceding beads by performing the laser beam irradiation in the above order for several circuits. In this manner, beads are continuously formed over the entire outer peripheral edge portion of the outer cover 16. That is, the entire outer peripheral edge portion is laser-welded. As shown in FIG. 7, shielding gas may preferably be sprayed on the entire welded part (laser-irradiated area) to prevent oxidation of the welded part.

According to the second embodiment, a pitch of forming beads, i.e., a pitch of laser beam irradiation is greater than a diameter (maximum width) of the beads. Therefore, laser irradiation can be performed without waiting a molten part of the preceding bead to be solidified, the laser beam irradiation cycle can be shortened and the time for laser welding can be largely reduced. For example, if irradiation is performed in the order of beads 1, 2, 3, . . . as shown in FIG. 8, a welded construction in which a circular bead exists in each of the two short side edges and one of the long side edges of the outer cover 16 can be achieved. In the present embodiment, the laser-irradiated position is largely moved, but the laser-irradiated position can be determined quickly by using the galvano scanner 70 having high response sensitivity.

In the second embodiment, the laser beam irradiation pitches P1, P2 and P3 may be equal to or different from each other. In addition, laser beam irradiation may be performed at not three points but two points or four points or more in one circuit. The laser beam irradiation device is not limited to a galvano scanner. The laser irradiation system used in the first embodiment may be used by increasing the irradiation pitch.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, materials, shapes, sizes, etc., of the elements constituting the enclosure may be changed as appropriate. In the magnetic disk device, the number of magnetic disks and magnetic heads may be increased or decreased as appropriate and the size of magnetic disks may be variously selected.

What is claimed is:
1. A method of manufacturing a disk device comprising an enclosure comprising a base and a cover; and a rotatable disk-shaped recording medium provided in the enclosure, the method comprising:
arranging the recording medium in the base; and
laser-welding a peripheral edge portion of the cover, which is put over an opening of the base, to the base by using a laser beam,
wherein the laser welding comprises pulse-irradiating the peripheral edge portion of the cover with the laser beam while repeatedly turning on and off output of the laser beam,
moving a point irradiated with the laser beam along the peripheral edge portion, setting a pitch of laser beam irradiation to be greater than a width of a weld bead formed by the laser beam irradiation, the laser beam irradiation is performed while making circuits of the peripheral edge portion of the cover, and the laser welding comprises forming first beads along the entire peripheral edge portion of the cover with the irradiation pitch greater than the width of the weld bead by the laser beam irradiation in a first circuit, and forming second beads along the entire peripheral edge portion of the cover with the irradiation pitch greater than the width of the weld bead to partially overlap the first beads by the laser beam irradiation in a second circuit.

2. The method of claim 1, further comprising filling the enclosure with low-density gas lower than air in density after the laser welding.

3. The method of claim 1, wherein
the laser welding comprises forming third beads along the entire peripheral edge portion of the cover with the irradiation pitch greater than the width of the weld bead to partially overlap the first and second beads by the laser beam irradiation in a third circuit.

4. The method of claim 1, wherein
the laser welding is performed while spraying shielding gas on a welded portion.

5. A disk device comprising:
a rotatable disk-shaped recording medium;
an actuator supporting a head to be movable with respect to the recording medium; and
an enclosure comprising a base accommodating the recording medium and the actuator, and a cover fixed to the base and comprising a peripheral edge portion including a welded portion laser-welded to the base,
wherein the welded portion comprises weld beads arranged along the entire peripheral edge portion of the cover,
the weld beads include at least two circular weld beads in the peripheral edge portion of the cover, and
the weld beads include first beads arranged with a pitch greater than a width of each of the first beads; and second beads arranged with a pitch greater than a width of each of the second beads, each of the second beads partially overlapping adjacent two of the first beads, and each of the second beads exists in a circular shape.

6. The disk device of claim 5, wherein
the weld beads include first beads arranged with a pitch greater than a width of each of the first beads; second beads arranged with a pitch greater than a width of each of the second beads, each of the second beads partially overlapping adjacent two of the first beads; and third beads arranged with a pitch greater than a width of each of the third beads, each of the third beads partially overlapping adjacent two of the first beads and adjacent two of the second beads, and each of the third beads exists in a circular shape.

7. The disk device of claim 6, wherein
the enclosure is filled with a low-density gas lower than the air in density.

8. The disk device of claim 5, wherein
the enclosure is filled with a low-density gas lower than the air in density.

9. A disk device comprising:
an enclosure comprising a base and a cover; and
a rotatable disk-shaped recording medium provided in the enclosure,
the disk device prepared by a process comprising:
arranging the recording medium in the base; and
laser-welding a peripheral edge portion of the cover, which is put over an opening of the base, to the base by using a laser beam,
wherein the laser welding comprises pulse-irradiating the peripheral edge portion of the cover with the laser beam while repeatedly turning on and off output of the laser beam,
moving a point irradiated with the laser beam along the peripheral edge portion,
setting a pitch of laser beam irradiation to be greater than a width of a weld bead formed by the laser beam irradiation,
the laser beam irradiation is performed while making circuits of the peripheral edge portion of the cover, and
the laser welding comprises forming first beads along the entire peripheral edge portion of the cover with the irradiation pitch greater than the width of the weld bead by the laser beam irradiation in a first circuit, and forming second beads along the entire peripheral edge portion of the cover with the irradiation pitch greater than the width of the weld bead to partially overlap the first beads by the laser beam irradiation in a second circuit.

10. The disk device of claim 9, wherein
the process further comprises filling the enclosure with low-density gas lower than air in density after the laser welding.

11. The disk device of claim 9, wherein
the laser welding comprises forming third beads along the entire peripheral edge portion of the cover with the irradiation pitch greater than the width of the weld bead to partially overlap the first and second beads by the laser beam irradiation in a third circuit.

12. The disk device of claim 9, wherein
the laser welding is performed while spraying shielding gas on a welded portion.

* * * * *